US009850735B2

(12) United States Patent
Fripp et al.

(10) Patent No.: US 9,850,735 B2
(45) Date of Patent: Dec. 26, 2017

(54) ISOLATION DEVICES CONTAINING A TRANSFORMING MATRIX AND A GALVANICALLY-COUPLED REINFORCEMENT AREA

(71) Applicant: Halliburton Energy Services, Inc., Houston, TX (US)

(72) Inventors: Michael L. Fripp, Carrollton, TX (US); Zachary W. Walton, Carrollton, TX (US); Zachary R. Murphree, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 244 days.

(21) Appl. No.: 14/769,417

(22) PCT Filed: Jan. 14, 2014

(86) PCT No.: PCT/US2014/011443
§ 371 (c)(1),
(2) Date: Aug. 20, 2015

(87) PCT Pub. No.: WO2015/108506
PCT Pub. Date: Jul. 23, 2015

(65) Prior Publication Data
US 2016/0002999 A1 Jan. 7, 2016

(51) Int. Cl.
*E21B 33/12* (2006.01)
*E21B 23/00* (2006.01)
(Continued)

(52) U.S. Cl.
CPC .............. *E21B 33/12* (2013.01); *C09K 8/426* (2013.01); *E21B 23/00* (2013.01); *E21B 41/00* (2013.01)

(58) Field of Classification Search
CPC combination set(s) only.
See application file for complete search history.

(56) References Cited

U.S. PATENT DOCUMENTS 3,768,563 A * 10/1973 Blount ................ E21B 33/1208
166/291
6,394,180 B1 * 5/2002 Berscheidt .............. E21B 33/12
166/133

(Continued)

FOREIGN PATENT DOCUMENTS

CN 102781608 A 11/2012

OTHER PUBLICATIONS

International Search Report and Written Opinion dated Jan. 14, 2014; PCT International Application No. PCT/US14/011443.
(Continued)

*Primary Examiner* — Kyle Armstrong
(74) *Attorney, Agent, or Firm* — McGuire Woods LLP

(57) ABSTRACT

A method of using a wellbore isolation device comprises: introducing the wellbore isolation device into the wellbore, wherein the isolation device comprises: (A) a matrix, wherein the matrix has a phase transition temperature less than or equal to the bottomhole temperature of the wellbore; and (B) at least one reinforcement area, wherein the reinforcement area: (i) comprises at least a first material, wherein the first material undergoes galvanic corrosion; and (ii) has a greater tensile strength and/or shear strength than the matrix.

17 Claims, 3 Drawing Sheets

(51) Int. Cl.
*C09K 8/42* (2006.01)
*E21B 41/00* (2006.01)

(56) References Cited

U.S. PATENT DOCUMENTS

| | | | |
|---|---|---|---|
| 9,187,975 B2* | 11/2015 | Rochen | B29C 53/76 |
| 2007/0181224 A1 | 8/2007 | Marya et al. | |
| 2010/0181729 A1 | 7/2010 | Slay et al. | |
| 2010/0270031 A1 | 10/2010 | Patel | |
| 2012/0234538 A1* | 9/2012 | Martin | B29C 70/24 |
| | | | 166/284 |
| 2013/0032357 A1* | 2/2013 | Mazyar | E21B 41/00 |
| | | | 166/376 |
| 2013/0062049 A1 | 3/2013 | Ren et al. | |
| 2013/0146302 A1* | 6/2013 | Gaudette | E21B 31/002 |
| | | | 166/376 |
| 2013/0277044 A1* | 10/2013 | King | E21B 33/12 |
| | | | 166/192 |
| 2013/0327540 A1* | 12/2013 | Hamid | E21B 33/1208 |
| | | | 166/376 |
| 2013/0333891 A1 | 12/2013 | Fripp et al. | |

OTHER PUBLICATIONS

European Extended Search Report dated May 29, 2017; European Patent Application No. 14878512.4.

\* cited by examiner

ISOLATION DEVICES CONTAINING A TRANSFORMING MATRIX AND A GALVANICALLY-COUPLED REINFORCEMENT AREA

TECHNICAL FIELD

Isolation devices can be used to separate one subterranean formation zone from another and prevent fluid flow between wellbore intervals. The isolation devices can be removed after use such that fluid communication is restored.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
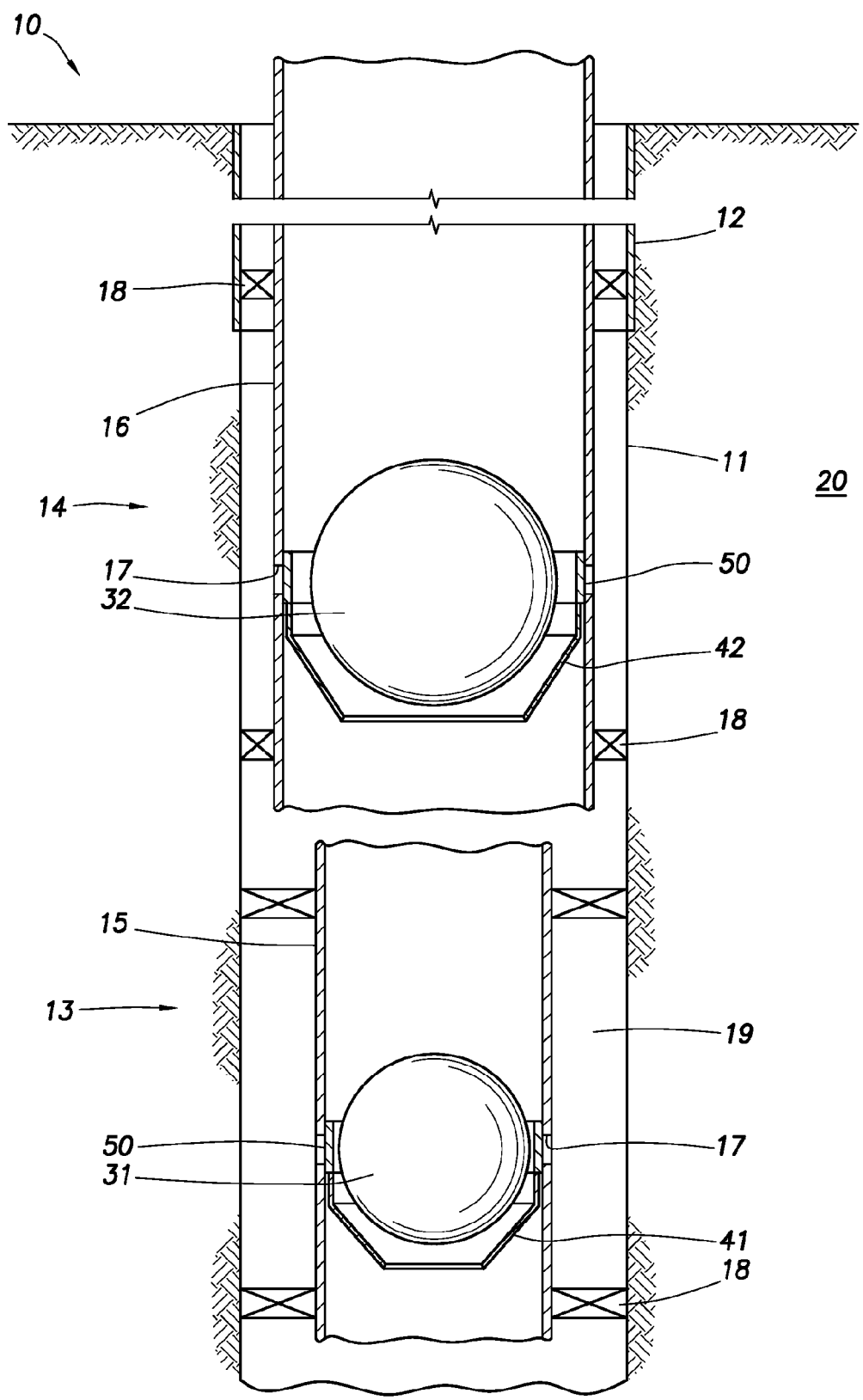
FIG. 1 is a schematic illustration of a well system containing more than one isolation device.

As used herein, the words "comprise," "have," "include," and all grammatical variations thereof are each intended to have an open, non-limiting meaning that does not exclude additional elements or steps.

It should be understood that, as used herein, "first," "second," "third," etc., are arbitrarily assigned and are merely intended to differentiate between two or more substances, materials, etc., as the case may be, and does not indicate any particular orientation or sequence. Furthermore, it is to be understood that the mere use of the term "first" does not require that there be any "second," and the mere use of the term "second" does not require that there be any "third," etc.

As used herein, a "fluid" is a substance having a continuous phase that tends to flow and to conform to the outline of its container when the substance is tested at a temperature of 71° F. (21.7° C.) and a pressure of one atmosphere "atm" (0.1 megapascals "MPa"). A fluid can be a liquid or gas.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, or an injection well. As used herein, a "well" includes at least one wellbore. The wellbore is drilled into a subterranean formation. The subterranean formation can be a part of a reservoir or adjacent to a reservoir. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

It is not uncommon for a wellbore to extend several hundreds of feet or several thousands of feet into a subterranean formation. The subterranean formation can have different zones. A zone is an interval of rock differentiated from surrounding rocks on the basis of its fossil content or other features, such as faults or fractures. For example, one zone can have a higher permeability compared to another zone. It is often desirable to treat one or more locations within multiples zones of a formation. One or more zones of the formation can be isolated within the wellbore via the use of an isolation device. An isolation device can be used for zonal isolation and functions to block fluid flow within a tubular, such as a tubing string, or within an annulus. The blockage of fluid flow prevents the fluid from flowing into the zones located below the isolation device and isolates the zone of interest. As used herein, the relative term "below" means at a location further away from a wellhead and "above" means at a location closer to the wellhead compared to a reference object. In this manner, treatment techniques can be performed within the zone of interest.

Common isolation devices include, but are not limited to, a ball, a plug, a bridge plug, a wiper plug, and a packer. It is to be understood that reference to a "ball" is not meant to limit the geometric shape of the ball to spherical, but rather is meant to include any device that is capable of engaging with a seat. A "ball" can be spherical in shape, but can also be a dart, a bar, or any other shape. Zonal isolation can be accomplished, for example, via a ball and seat by dropping the ball from the wellhead onto the seat that is located within the wellbore. The ball engages with the seat, and the seal created by this engagement prevents fluid communication into other zones downstream of the ball and seat. In order to treat more than one zone using a ball and seat, the wellbore can contain more than one ball seat. For example, a seat can be located within each zone. Generally, the inner diameter (I.D.) of the ball seats are different for each zone. For example, the I.D. of the ball seats sequentially decrease at each zone, moving from the wellhead to the bottom of the well. In this manner, a smaller ball is first dropped into a first zone that is the farthest downstream; that zone is treated; a slightly larger ball is then dropped into another zone that is located upstream of the first zone; that zone is then treated;

and the process continues in this fashion—moving upstream along the wellbore—until all the desired zones have been treated. As used herein, the relative term "upstream" means at a location closer to the wellhead.

A bridge plug is composed primarily of slips, a plug mandrel, and a rubber sealing element. A bridge plug can be introduced into a wellbore and the sealing element can be caused to block fluid flow into downstream zones. A packer generally consists of a sealing device, a holding or setting device, and an inside passage for fluids. A packer can be used to block fluid flow through the annulus located between the outside of a tubular and the wall of the wellbore or inside of a casing.

Isolation devices can be classified as permanent or retrievable. While permanent isolation devices are generally designed to remain in the wellbore after use, retrievable devices are capable of being removed after use. It is often desirable to use a retrievable isolation device in order to restore fluid communication between one or more zones. Traditionally, isolation devices are retrieved by inserting a retrieval tool into the wellbore, wherein the retrieval tool engages with the isolation device, attaches to the isolation device, and the isolation device is then removed from the wellbore. Another way to remove an isolation device from the wellbore is to mill at least a portion of the device. Yet, another way to remove an isolation device is to contact the device with a solvent, such as an acid, thus dissolving all or a portion of the device.

However, some of the disadvantages to using traditional methods to remove a retrievable isolation device include: it can be difficult and time consuming to use a retrieval tool; milling can be time consuming and costly; and premature dissolution of the isolation device can occur. For example, premature dissolution can occur if acidic fluids are used in the well prior to the time at which it is desired to dissolve the isolation device.

It is often desirable to have a substance undergo a phase transition at the bottomhole temperature of a well. The bottomhole temperature of a well varies significantly, depending on the subterranean formation, and can range from about 100° F. to about 600° F. (about 37.8° C. to about 315.6° C.). As used herein, the term "bottomhole" means at the location of the isolation device. As used herein, a "phase transition" means any change that occurs to the physical properties of the substance. As used herein, a "phase transition" can include, without limitation, a change in the phase of the substance (i.e., from a solid to a liquid or semi-liquid, from a liquid or semi-liquid to a gas, etc.), a glass transition, a change in the amount of crystallinity of the substance, physical changes to the amorphous and/or crystalline portions of the substance, and any combinations thereof. The glass transition can occur in the amorphous regions of the substance. A substance will undergo a phase transition at a "phase transition temperature." As used herein, a "phase transition temperature" includes a single temperature and a range of temperatures at which the substance undergoes a phase transition. Therefore, it is not necessary to continually specify that the phase transition temperature can be a single temperature or a range of temperatures throughout. By way of example, a substance will have a glass transition temperature or range of temperatures, symbolized as $T_g$. The $T_g$ of a substance is generally lower than its melting temperature $T_m$.

However, the options of elements available for use in these circumstances are severely limited because there are only so many elements to choose from and each element, for example, has a single, unique melting point at a given pressure. A different material may have to be used that has a melting point equal to or less than the bottomhole temperature of the well. A composition of two or more substances will have a phase transition that is different from the phase transitions of the individual substances making up the mixture. The use of various compositions increases the number of phase transition temperatures that are available for use. In this manner, one can determine the bottomhole temperature and pressure of a well and then select the appropriate composition for use at that temperature and pressure.

A eutectic composition is a mixture of two or more substances that undergoes a phase transition at a lower temperature than all of its pure constituent components. A solid-liquid phase transition temperature can also be referred to as the freezing point or melting point of a substance or composition. The substances making up the eutectic composition can be compounds, such as metal alloys (including fusible alloys) or thermoplastics, or metallic elements. By way of example, the melting point of bismuth at atmospheric pressure (101 kilopascals) is 520° F. (271.1° C.) and the melting point of lead is 621° F. (327.2° C.); however, the melting point of a composition containing 55.5% bismuth and 44.5% lead has a melting point of 244° F. (117.8° C.). As can be seen the bismuth-lead composition has a much lower melting point than both, elemental bismuth and elemental lead. Not all compositions have a melting point that is lower than all of the individual substances making up the composition. By way of example, a composition of silver and gold has a higher melting point compared to pure silver, but is lower than that of pure gold. Therefore, a silver-gold composition cannot be classified as a eutectic composition.

A eutectic composition can also be differentiated from other compositions because it solidifies (or melts) at a single, sharp temperature. It is to be understood that the phrases "phase transition" and "solid-liquid phase transition," the term "melt" and all grammatical variations thereof, and the term "freeze" and all grammatical variations thereof are meant to be synonymous. Non-eutectic compositions generally have a range of temperatures at which the composition melts. There are other compositions that can have both: a range of temperatures at which the composition melts; and a melting point less than at least one of the individual substances making up the composition. These other substances can be called hypo- and hyper-eutectic compositions. A hypo-eutectic composition contains the minor substance (i.e., the substance that is in the lesser concentration) in a smaller amount than in the eutectic composition of the same substances. A hyper-eutectic composition contains the minor substance in a larger amount than in the eutectic composition of the same substances. Generally, with few exceptions, a hypo- and hyper-eutectic composition will have a phase transition temperature higher than the eutectic transition temperature but less than the melting point of the individual substances making up the composition.

The following table illustrates a eutectic, hypo- and hyper-eutectic composition, the concentration of each substance making up the composition (expressed as a % by weight of the composition), and their corresponding transition temperature and melting temperature ranges. As can be seen, the hyper-eutectic composition contains cadmium (the minor substance) in a larger amount than the eutectic composition, and the hypo-eutectic composition contains cadmium in a smaller amount than in the eutectic composition. As can also be seen, both the hyper- and hypo-eutectic compositions have a range of melting points; whereas, the eutectic composition has a single melting temperature.

Moreover, all 3 compositions have a transition temperature or melting point range that is lower than each of the 4 individual elements—Bi equals 520° F. (271.1° C.), Pb equals 621° F. (327.2° C.), Sn equals 450° F. (232.2° C.), and Cd equals 610° F. (321.1° C.).

| Type of Composition | Conc. of Bismuth (Bi) | Conc. of Lead (Pb) | Conc. of Tin (Sn) | Conc. of Cadmium (Cd) | Melting Temperature (° F.) |
|---|---|---|---|---|---|
| Eutectic | 50 | 26.7 | 13.3 | 10 | 158 |
| Hyper-eutectic | 50 | 25 | 12.5 | 12.5 | 158-165 |
| Hypo-eutectic | 50.5 | 27.8 | 12.4 | 9.3 | 158-163 |

A fusible alloy can be a eutectic composition. As used herein, the term "fusible alloy" means an alloy wherein at least one phase of the alloy has a melting point below 482° F. (250° C.). As used herein, the term "metal alloy" means a mixture of two or more elements, wherein at least one of the elements is a metal. The other element(s) can be a non-metal or a different metal. An example of a metal and non-metal alloy is steel, comprising the metal element iron and the non-metal element carbon. An example of a metal and metal alloy is bronze, comprising the metallic elements copper and tin.

It can be difficult to make an isolation device containing only a eutectic composition because these substances tend to have a low yield strength and a high elongation. As a result, isolation devices made from these eutectic compositions may fail to provide zonal isolation due to strength failure or elongation. There is thus a need to provide isolation devices that have a desired strength and undergo a phase transition after a desired amount of time. It has been discovered that an isolation device can be made from a eutectic composition and galvanically-coupled reinforcements.

Galvanic corrosion occurs when two different metals or metal alloys are in electrical connectivity with each other and both are in contact with an electrolyte. As used herein, the phrase "electrical connectivity" means that the two different metals or metal alloys are either touching or in close enough proximity to each other such that when the two different metals are in contact with an electrolyte, the electrolyte becomes electrically conductive and ion migration occurs between one of the metals and the other metal, and is not meant to require an actual physical connection between the two different metals, for example, via a metal wire. It is to be understood that as used herein, the term "metal" is meant to include pure metals and also metal alloys without the need to continually specify that the metal can also be a metal alloy. Moreover, the use of the phrase "metal or metal alloy" in one sentence or paragraph does not mean that the mere use of the word "metal" in another sentence or paragraph is meant to exclude a metal alloy.

The metal that is less noble, compared to the other metal, will dissolve in the electrolyte. The less noble metal is often referred to as the anode, and the more noble metal is often referred to as the cathode. Galvanic corrosion is an electro-chemical process whereby free ions in the electrolyte make the electrolyte electrically conductive, thereby providing a means for ion migration from the anode to the cathode—resulting in deposition formed on the cathode. Metals can be arranged in a galvanic series. The galvanic series lists metals in order of the most noble to the least noble. An anodic index lists the electrochemical voltage (V) that develops between a metal and a standard reference electrode (gold (Au)) in a given electrolyte. The actual electrolyte used can affect where a particular metal or metal alloy appears on the galvanic series and can also affect the electrochemical voltage. For example, the dissolved oxygen content in the electrolyte can dictate where the metal or metal alloy appears on the galvanic series and the metal's electrochemical voltage. The anodic index of gold is −0 V; while the anodic index of beryllium is −1.85 V. A metal that has an anodic index greater than another metal is more noble than the other metal and will function as the cathode. Conversely, the metal that has an anodic index less than another metal is less noble and functions as the anode. In order to determine the relative voltage between two different metals, the anodic index of the lesser noble metal is subtracted from the other metal's anodic index, resulting in a positive value.

There are several factors that can affect the rate of galvanic corrosion. One of the factors is the distance separating the metals on the galvanic series chart or the difference between the anodic indices of the metals. For example, beryllium is one of the last metals listed at the least noble end of the galvanic series and platinum is one of the first metals listed at the most noble end of the series. By contrast, tin is listed directly above lead on the galvanic series. Using the anodic index of metals, the difference between the anodic index of gold and beryllium is 1.85 V; whereas, the difference between tin and lead is 0.05 V. This means that galvanic corrosion will occur at a much faster rate for magnesium or beryllium and gold compared to lead and tin.

The following is a partial galvanic series chart using a deoxygenated sodium chloride water solution as the electrolyte. The metals are listed in descending order from the most noble (cathodic) to the least noble (anodic). The following list is not exhaustive, and one of ordinary skill in the art is able to find where a specific metal or metal alloy is listed on a galvanic series in a given electrolyte.
PLATINUM
GOLD
ZIRCONIUM
GRAPHITE
SILVER
CHROME IRON
SILVER SOLDER
COPPER—NICKEL ALLOY 80-20
COPPER—NICKEL ALLOY 90-10
MANGANESE BRONZE (CA 675), TIN BRONZE (CA903, 905)
COPPER (CA102)
BRASSES
NICKEL (ACTIVE)
TIN
LEAD
ALUMINUM BRONZE
STAINLESS STEEL
CHROME IRON
MILD STEEL (1018), WROUGHT IRON
ALUMINUM 2117, 2017, 2024
CADMIUM
ALUMINUM 5052, 3004, 3003, 1100, 6053
ZINC
MAGNESIUM
BERYLLIUM The following is a partial anodic index listing the voltage of a listed metal against a standard reference electrode (gold) using a deoxygenated sodium chloride water solution as the electrolyte. The metals are listed in descending order from the greatest voltage (most cathodic) to the least voltage (most anodic). The following list is not exhaustive, and one of ordinary skill in the art is able to find the anodic index of a specific metal or metal alloy in a given electrolyte.

| Anodic index | |
|---|---|
| Metal | Index (V) |
| Gold, solid and plated, Gold-platinum alloy | −0.00 |
| Rhodium plated on silver-plated copper | −0.05 |
| Silver, solid or plated; monel metal. High nickel-copper alloys | −0.15 |
| Nickel, solid or plated, titanium an s alloys, Monel | −0.30 |
| Copper, solid or plated; low brasses or bronzes; silver solder; German silvery high copper-nickel alloys; nickel-chromium alloys | −0.35 |
| Brass and bronzes | −0.40 |
| High brasses and bronzes | −0.45 |
| 18% chromium type corrosion-resistant steels | −0.50 |
| Chromium plated; tin plated; 12% chromium type corrosion-resistant steels | −0.60 |
| Tin-plate; tin-lead solder | −0.65 |
| Lead, solid or plated; high lead alloys | −0.70 |
| 2000 series wrought aluminum | −0.75 |
| Iron, wrought, gray or malleable, plain carbon and low alloy steels | −0.85 |
| Aluminum, wrought alloys other than 2000 series aluminum, cast alloys of the silicon type | −0.90 |
| Aluminum, cast alloys other than silicon type, cadmium, plated and chromate | −0.95 |
| Hot-dip-zinc plate; galvanized steel | −1.20 |
| Zinc, wrought; zinc-base die-casting alloys; zinc plated | −1.25 |
| Magnesium & magnesium-base alloys, cast or wrought | −1.75 |
| Beryllium | −1.85 |

Another factor that can affect the rate of galvanic corrosion is the temperature and concentration of the electrolyte. The higher the temperature and concentration of the electrolyte, the faster the rate of corrosion. Yet another factor that can affect the rate of galvanic corrosion is the total amount of surface area of the least noble (anodic) metal. The greater the surface area of the anode that can come in contact with the electrolyte, the faster the rate of corrosion. The cross-sectional size of the anodic metal pieces can be decreased in order to increase the total amount of surface area per total volume of the material. Yet another factor that can affect the rate of galvanic corrosion is the ambient pressure. Depending on the electrolyte chemistry and the two metals, the corrosion rate can be slower at higher pressures than at lower pressures if gaseous components are generated.

According to an embodiment, a wellbore isolation device comprises: a matrix, wherein the matrix has a phase transition temperature less than or equal to the bottomhole temperature of the wellbore; and at least one reinforcement area, wherein the reinforcement area: (i) comprises at least a first material, wherein the first material undergoes galvanic corrosion; and (ii) has a greater tensile strength and/or shear strength than the matrix.

According to another embodiment, a method of using wellbore isolation device comprises: introducing the wellbore isolation device into the wellbore.

According to another embodiment, a method of removing the wellbore isolation device comprises: introducing the wellbore isolation device into the wellbore; causing or allowing at least a portion of the matrix to undergo a phase transition; and causing or allowing at least a portion of the first material to galvanically corrode.

Any discussion of the embodiments regarding the isolation device or any component related to the isolation device (e.g., the first composition) is intended to apply to all of the apparatus and method embodiments.

Turning to the Figures, FIG. 1 depicts an example of a well system 10. The well system 10 can include at least one wellbore 11. The wellbore 11 can penetrate a subterranean formation 20. The subterranean formation 20 can be a portion of a reservoir or adjacent to a reservoir. The wellbore 11 can include a casing 12. The wellbore 11 can include a generally vertical wellbore section or can include a generally horizontal wellbore section or a combination thereof. A first section of tubing string 15 can be installed in the wellbore 11. A second section of tubing string 16 (as well as multiple other sections of tubing string, not shown) can be installed in the wellbore 11. The well system 10 can comprise at least a first zone 13 and a second zone 14. The well system 10 can also include more than two zones, for example, the well system 10 can further include a third zone, a fourth zone, and so on. The well system 10 can further include one or more packers 18. The packers 18 can be used in addition to the isolation device to isolate each zone of the wellbore 11. The isolation device can be the packers 18. The packers 18 can be used to help prevent fluid flow between one or more zones (e.g., between the first zone 13 and the second zone 14) via an annulus 19. The tubing string 15/16 can also include one or more ports 17. One or more ports 17 can be located in each section of the tubing string. Moreover, not every section of the tubing string needs to include one or more ports 17. For example, the first section of tubing string 15 can include one or more ports 17, while the second section of tubing string 16 does not contain a port. In this manner, fluid flow into the annulus 19 for a particular section can be selected based on the specific oil or gas operation.

It should be noted that the well system 10 is illustrated in the drawings and is described herein as merely one example of a wide variety of well systems in which the principles of this disclosure can be utilized. It should be clearly understood that the principles of this disclosure are not limited to any of the details of the well system 10, or components thereof, depicted in the drawings or described herein. Furthermore, the well system 10 can include other components not depicted in the drawing. For example, the well system 10 can further include a well screen. By way of another example, cement may be used instead of packers 18 to aid the isolation device in providing zonal isolation. Cement may also be used in addition to packers 18.

As can be seen in FIG. 1, the first section of tubing string 15 can be located within the first zone 13 and the second section of tubing string 16 can be located within the second zone 14. The wellbore isolation device can be a ball, a plug, a bridge plug, a wiper plug, or a packer. The wellbore isolation device can restrict fluid flow past the device. The wellbore isolation device may be a free falling device, may be a pumped-down device, or it may be tethered to the surface. As depicted in the drawings, the isolation device can be a ball 30 (e.g., a first ball 31 or a second ball 32) and a seat 40 (e.g., a first seat 41 or a second seat 42). The ball 30 can engage the seat 40. The seat 40 can be located on the inside of a tubing string. When the first section of tubing string 15 is located below the second section of tubing string 16, then the inner diameter (I.D.) of the first seat 41 can be less than the I.D. of the second seat 42. In this manner, a first ball 31 can be placed into the first section of tubing string 15. The first ball 31 can have a smaller diameter than a second ball 32. The first ball 31 can engage a first seat 41. Fluid can now be temporarily restricted or prevented from flowing into any zones located downstream of the first zone 13. In the event it is desirable to temporarily restrict or prevent fluid flow into any zones located downstream of the second zone 14, the second ball 32 can be placed into second section of tubing string 16 and will be prevented from falling into the first section of tubing string 15 via the second seat 42 or because the second ball 32 has a larger outer diameter (O.D.) than the I.D. of the first seat 41. The second ball 32 can engage the second seat 42. The ball (whether it be a first ball 31 or a second ball 32) can engage a sliding sleeve 50 during placement. This engagement with the sliding sleeve 50 can cause the sliding sleeve to move; thus, opening a port 17 located adjacent to the seat. The port 17 can also be opened via a variety of other mechanisms instead of a ball. The use of other mechanisms may be advantageous when the isolation device is not a ball. After placement of the isolation device, fluid can be flowed from, or into, the subterranean formation 20 via one or more opened ports 17 located within a particular zone. As such, a fluid can be produced from the subterranean formation 20 or injected into the formation.

According to an embodiment, the isolation device restricts or prevents fluid flow between a first zone 13 and a second zone 14. By way of example, the isolation device can be used to restrict or prevent fluid flow between different zones within the tubing string while packers 18 and/or cement can be used to restrict or prevent fluid flow between different zones within the annulus 19. The isolation device can also be the only device used to prevent or restrict fluid flow between zones. By way of another example, there can also be two or more isolation devices positioned within a given zone. According to this example, one isolation device can be a packer while the other isolation device can be a ball and seat or a bridge plug. The first zone 13 can be located above or below the second zone 14. In this manner, depending on the oil or gas operation, fluid is restricted or prevented from flowing into the second zone 14.

The isolation device comprises a matrix 35. The matrix 35 can comprise at least a first substance. The matrix 35 can also comprise more than one substance (e.g., a second, a third, a fourth, and so on substances). The matrix can comprise a metal, a metal alloy, a polymer, or combinations thereof. According to an embodiment, the polymer is a plastic. The plastic can be a thermoplastic. According to another embodiment, the metal alloy is a fusible metal alloy. The metal or the metal of the metal alloy (including a fusible metal alloy) can be selected from the group consisting of, lithium, sodium, potassium, rubidium, cesium, beryllium, magnesium, calcium, strontium, barium, radium, aluminum, gallium, indium, tin, thallium, lead, bismuth, scandium, titanium, vanadium, chromium, manganese, iron, cobalt, nickel, copper, zinc, yttrium, zirconium, niobium, molybdenum, ruthenium, rhodium, palladium, silver, cadmium, lanthanum, hafnium, tantalum, tungsten, rhenium, osmium, iridium, platinum, gold, graphite, and combinations thereof. Preferably, the metal or metal of the metal alloy is selected from the group consisting of lead, tin, bismuth, indium, cadmium, silver, gallium, zinc, antimony, copper, magnesium, aluminum, and combinations thereof. According to an embodiment, the metal is not a toxic heavy metal. The fusible alloy can also contain a non-metal. The matrix 35 can be a eutectic, hypo-eutectic, or hyper-eutectic composition.

The matrix 35 has a phase transition temperature less than or equal to the bottomhole temperature of the wellbore 11. As used herein, the term "bottomhole" means at the location of the isolation device. According to another embodiment, the matrix undergoes a phase transition at or near the bottomhole temperature of the wellbore after a desired amount of time. According to another embodiment, the matrix undergoes a phase transition at a temperature that is at least 36° F. (2.2° C.) higher than the surface temperature. In this manner, the matrix 35 is in a solid state prior to introduction into the wellbore. Then, after the isolation device 30 is introduced into the wellbore, the temperature of the area surrounding the isolation device can increase (for example, due to a cessation of pumping a fluid in which the subterranean formation can increase the wellbore temperature or a heated fluid can be pumped downhole). The temperature can be sufficient to cause at least a portion of the matrix 35 to undergo the phase transition such that zonal isolation is no longer achieved.

Preferably, if the matrix includes more than one substance, then the substances are intermixed to form the matrix 35. As used herein, the term "intermixed" means that all of the substances are relatively uniformly distributed throughout the composition and very few pockets, if any, of just one of the substances exist. The matrix 35 can also be formed via a variety of processes known to those of ordinary skill in the art, including but not limited to, powder metallurgy.

The matrix 35 may not have enough strength of its own to withstand a specific pressure differential. Therefore, the isolation device 30 also includes at least one reinforcement area 36. As used herein, the term "withstand," and all grammatical variations thereof means that the substance does not crack, break, or collapse. The pressure differential can be the bottomhole pressure of the subterranean formation 20 across the device. Formation pressures can range from about 1,000 to about 30,000 pounds force per square inch (psi) (about 6.9 to about 206.8 megapascals "MPa"). The pressure differential can also be created during oil or gas operations. For example, a fluid, when introduced into the wellbore 11 above or below the isolation device, can create a higher pressure above or below, respectively, of the isolation device. Pressure differentials can range from about 100 to over 10,000 psi (about 0.7 to over 68.9 MPa).

The reinforcement area 36 comprises at least a first material, wherein the first material undergoes galvanic corrosion. The first material can undergo galvanic corrosion when an electrically conductive path exists between the first material and a second material and at least a portion of the first and second materials are in contact with an electrolyte. The first material can be the anode of the galvanic system. The first material and the second material are metals or metal alloys. The metal or metal of the metal alloy can be selected from the group consisting of, lithium, sodium, potassium, rubidium, cesium, beryllium, magnesium, calcium, strontium, barium, radium, aluminum, gallium, indium, tin, thallium, lead, bismuth, scandium, titanium, vanadium, chromium, manganese, iron, cobalt, nickel, copper, zinc, yttrium, zirconium, niobium, molybdenum, ruthenium, rhodium, palladium, silver, cadmium, lanthanum, hafnium, tantalum, tungsten, rhenium, osmium, iridium, platinum, gold, graphite, and combinations thereof. Preferably, the metal or metal of the metal alloy is selected from the group consisting of beryllium, tin, iron, nickel, copper, zinc, magnesium, aluminum, and combinations thereof. According to an embodiment, the metal is neither radioactive, unstable, nor theoretical.

According to an embodiment, the first material and the second material are different metals or metal alloys. By way of example, the first material can be nickel and the second material can be gold. Furthermore, the first material can be a metal and the second material can be a metal alloy. The first material and the second material can be a metal and the first and second material can be a metal alloy. According to an embodiment, the second material has a greater anodic index than the first material. Stated another way, the second material is listed higher on a galvanic series than the first material. According to another embodiment, the second material is more noble than the first material. In this manner, the first material acts as an anode and the second material acts as a cathode. Moreover, in this manner, the first material (acting as the anode) at least partially dissolves when in electrical connectivity with the second material and when the first and second materials are in contact with the electrolyte. The second material can be part of the reinforcement area 36, the matrix 35, the tubing string 15/16, the seat 40, or any other wellbore component provided that the second material is in electrical connectivity with the first material.

The electrolyte can be a wellbore fluid or a reservoir fluid. A wellbore fluid can be any type of fluid (e.g., a drilling fluid, spacer fluid, completion fluid, or workover fluid) that is introduced into the wellbore. The oil, gas, or water produced from the wellbore is called a reservoir fluid. As used herein, an electrolyte is any substance containing free ions (i.e., a positive- or negative-electrically charged atom or group of atoms) that make the substance electrically conductive. The electrolyte can be selected from the group consisting of, solutions of an acid, a base, a salt, and combinations thereof. A salt can be dissolved in water, for example, to create a salt solution. Common free ions in an electrolyte include sodium ($Na^+$), potassium ($K^+$), calcium ($Ca^{2+}$), magnesium ($Mg^{2+}$), chloride ($Cl^-$), hydrogen phosphate ($HPO_4^{2-}$), and hydrogen carbonate ($HCO_3^-$). The concentration (i.e., the total number of free ions available in the electrolyte) of the electrolyte can be adjusted to control the rate of galvanic corrosion of the first material. According to an embodiment, the concentration of the electrolyte is selected such that the at least a portion of the first material undergoes galvanic corrosion in the desired amount of time. If more than one electrolyte is used, then the concentration of the electrolytes is selected such that the first material undergoes galvanic corrosion in a desired amount of time. The concentration can be determined based on at least the specific metals or metal alloys selected for the first and second materials and the bottomhole temperature of the well. Moreover, because the free ions in the electrolyte enable the electrochemical reaction to occur between the first and second materials by donating its free ions, the number of free ions will decrease as the reaction occurs. At some point, the electrolyte may be depleted of free ions if there is any remaining first and second materials that have not reacted. If this occurs, the galvanic corrosion that causes the first material to dissolve will stop. In this example, it may be necessary to cause or allow the first and second materials to come in contact with a second, third, or fourth, and so on, electrolyte(s).

There are several factors that can affect the rate of dissolution via galvanic corrosion of the first material. According to an embodiment, the first and second materials are selected such that the at least a portion of the first material dissolves in the desired amount of time. By way of example, the greater the difference between the second material's anodic index and the first material's anodic index, the faster the rate of dissolution. By contrast, the less difference between the second material's anodic index and the first material's anodic index, the slower the rate of dissolution. By way of yet another example, the farther apart the first material and the second material are from each other in a galvanic series, the faster the rate of dissolution; and the closer together the first and second material are to each other in the galvanic series, the slower the rate of dissolution. By evaluating the difference in the anodic index of the first and second materials, or by evaluating the order in a galvanic series, one of ordinary skill in the art will be able to determine the rate of dissolution of the first material in a given electrolyte.

Another factor that can affect the rate of dissolution of the first material is the proximity of the first material to the second material. Generally, the closer the first material is physically to the second material, the faster the rate of dissolution of the first material. By contrast, generally, the farther apart the first and second materials are from one another, the slower the rate of dissolution. It should be noted that the distance between the first material and the second material should not be so great that an electrically conductive path ceases to exist between the first and second materials. According to an embodiment, any distance between the first and second materials is selected such that the at least a portion of the first material undergoes galvanic corrosion in the desired amount of time.

Another factor that can affect the rate of dissolution via galvanic corrosion of the first material is the concentration of the electrolyte and the temperature of the electrolyte. Generally, the higher the concentration of the electrolyte, the faster the rate of dissolution of the first material, and the lower the concentration of the electrolyte, the slower the rate of dissolution. Moreover, the higher the temperature of the electrolyte, the faster the rate of dissolution of the first material, and the lower the temperature of the electrolyte, the slower the rate of dissolution. One of ordinary skill in the art can select: the exact metals and/or metal alloys, the proximity of the first and second materials, and the concentration of the electrolyte based on an anticipated temperature in order for the at least a portion of the first material to undergo galvanic corrosion in the desired amount of time.

The reinforcement area 36 has a greater tensile strength and/or shear strength than the matrix 35. According to another embodiment, the reinforcement area 36 increases the overall strength of the isolation device 30. This greater strength can help the isolation device 30 withstand the pressure differentials that the isolation device 30 will be subjected to down hole. According to an embodiment, the reinforcement area 36 is positioned and selected such that the isolation device 30 withstands a specific pressure differential (e.g., the bottomhole pressure differential). According to another embodiment, the first and/or second materials are selected such that the isolation device 30 withstands a specific pressure differential.

Figure 2:
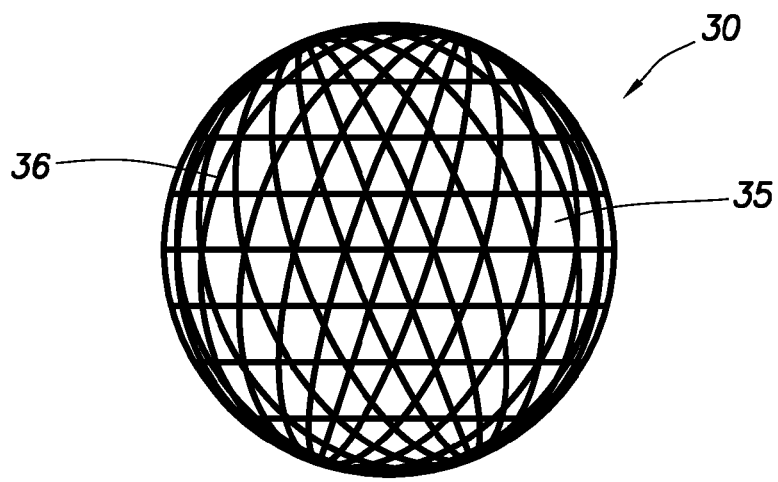
FIG. 2 is a schematic illustration of the isolation device having a geometric shell as the reinforcement area according to an embodiment.
Figure 3:
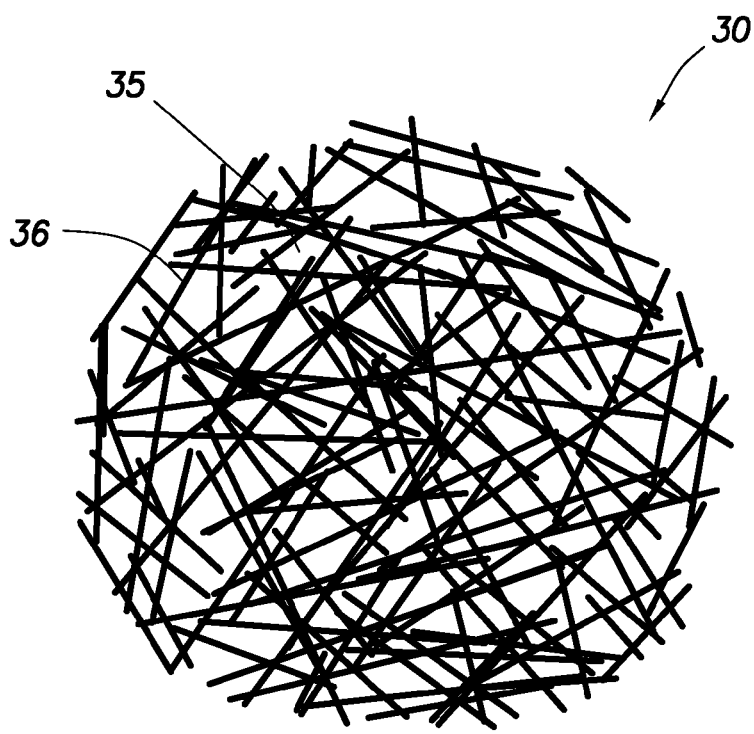
FIG. 3 is a schematic illustration of the isolation device having rod-shaped pieces making up the reinforcement area according to another embodiment.
Figure 4:
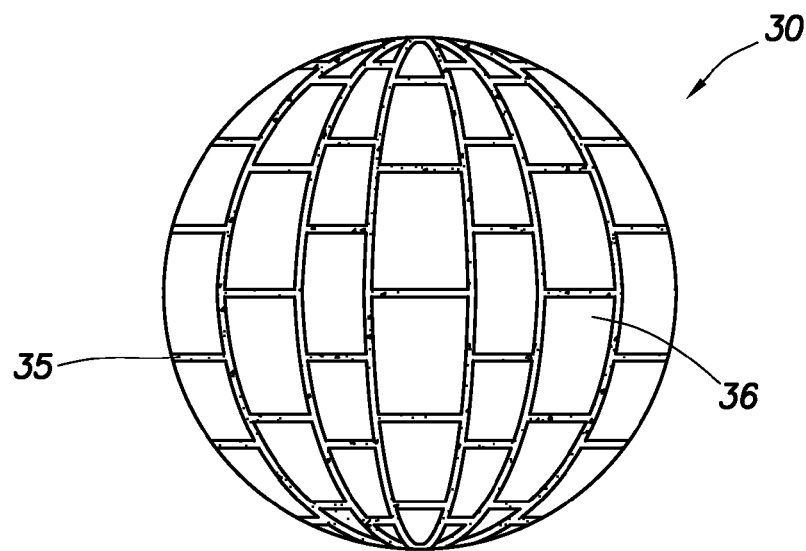
FIG. 4 is a schematic illustration of the isolation device having a different geometric shell as the reinforcement area according to another embodiment.

As can be seen in FIGS. 2-4, the reinforcement area 36 can span the entire perimeter of the isolation device 30. The reinforcement area can be for part of or the whole of the isolation device. For example, the reinforcement first material can be particles that are distributed throughout a portion or the entire matrix of the isolation device. The reinforcement area 36 can contain pores. For example, the reinforcement area 36 can be cage-like and made from pieces bound together. The matrix 35 can be contained within the reinforcement area 36. The matrix 35 can flow through the pores of the reinforcement area 36 after undergoing the phase transition. In this manner, the portion of the matrix 35 that undergoes the phase transition is no longer contained within the reinforcement area 36. The pieces of the reinforcement area 36 can be bound together to form geometrically-shaped pores, depicted in FIG. 2 as triangular. The pieces can also be rods as depicted in FIG. 3 or other geometric shapes, such as rectangular "bricks" as shown in FIG. 4. The matrix 35 can be used to bind the pieces together to form the reinforcement area 36 (best shown in FIG. 4). Other substances known to those skilled in the art can be used to bind the pieces of the reinforcement area 36 together. Though not shown, the reinforcement area 36 can also be spherical nuggets of material bound together or a shell that partially or totally surrounds the perimeter of the isolation device 30.

Figure 5:
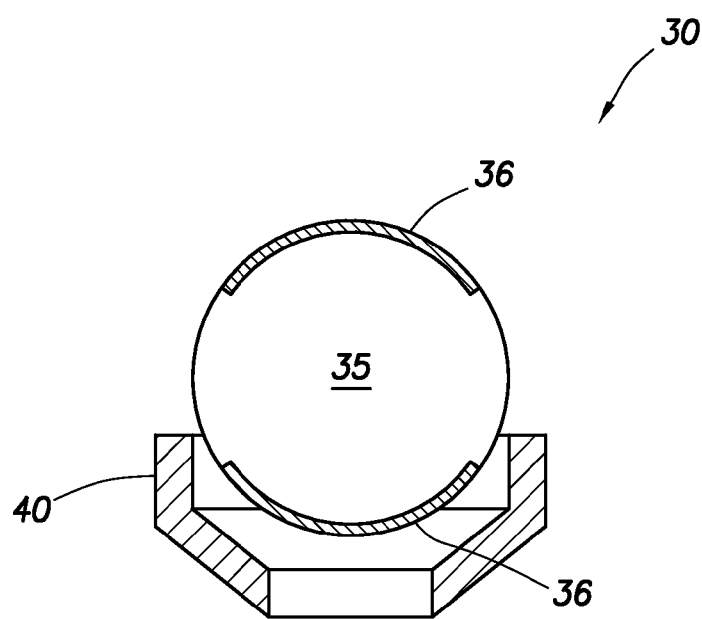
FIG. 5 is a schematic illustration of the isolation device having two reinforcement areas.

As can be seen in FIG. 5, the isolation device 30 can contain more than one reinforcement area 36, wherein each reinforcement area only partially spans the perimeter of the isolation device 30. Of course, there can only be one of the two reinforcement areas 36 that are depicted in FIG. 5. The isolation device 30 can further include an orientor for orienting the isolation device 30 in a particular position. By way of example, if the isolation device 30 only contains one reinforcement area 36 that does not span the entire perimeter, then the orientor can ensure that a ball for example, lands on the seat such that the reinforcement area is in contact with the seat. This enables the ball to withstand a specific pressure differential.

The methods include introducing the isolation device 30 into the wellbore 11. The step of introducing can include installing the wellbore isolation device in the wellbore. More than one isolation device can also be introduced in multiple portions of the wellbore. According to an embodiment, the isolation device is introduced such that it is capable of restricting or preventing fluid flow within a portion of the wellbore. The isolation device can also be positioned such that a first zone is isolated from a second zone.

The methods also include causing or allowing at least a portion of the matrix to undergo a phase transition. According to this embodiment, the bottomhole temperature of the wellbore can be allowed or caused to increase to a temperature above the phase transition temperature of the matrix 35. The temperature can be allowed to increase, for example, due to a sufficient subterranean formation temperature. The temperature can also be caused to increase, for example, due to cessation of pumping a fluid having a lower temperature than the subterranean formation or due to pumping a heated fluid into the wellbore. Each of the substances making up the matrix can be selected such that the matrix undergoes selective phase transitions at a desired time or at different times. For example, the matrix can be made from layers of combined substances that each undergo a phase transition at different times. In this manner, the matrix can be made to selectively melt.

The method also include causing or allowing at least a portion of the first material to galvanically corrode. The methods can further include contacting or allowing the wellbore isolation device to come in contact with an electrolyte. The step of contacting can include introducing the electrolyte into the wellbore 11. The step of allowing can include allowing the isolation device to come in contact with an electrolyte fluid, such as a reservoir fluid. The methods can include contacting or allowing the device to come in contact with two or more electrolytes. If more than one electrolyte is used, the free ions in each electrolyte can be the same or different. A first electrolyte can be, for example, a stronger electrolyte compared to a second electrolyte. Furthermore, the concentration of each electrolyte can be the same or different. It is to be understood that when discussing the concentration of an electrolyte, it is meant to be a concentration prior to contact with either the first and second materials, as the concentration will decrease during the galvanic corrosion reaction. Tracers can be used to help determine the necessary concentration of the electrolyte to help control the rate and finality of dissolution of the first material. For example, if it is desired that the first material dissolves to a point to enable the isolation device to be flowed from the wellbore 11 within 5 days and information from a tracer indicates that the rate of dissolution is too slow, then a more concentrated electrolyte can be introduced into the wellbore or allowed to contact the first and second materials. By contrast, if the rate of dissolution is occurring too quickly, then the first electrolyte can be flushed from the wellbore and a less concentrated electrolyte can then be introduced into the wellbore.

The methods can also include flowing the portion of the matrix 35 that underwent the phase transition and the portion of the first material that underwent galvanic corrosion towards the wellhead of the wellbore 11. The step of flowing can also include flowing the entire isolation device 30 towards the wellhead of the wellbore.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of using a wellbore isolation device comprising:
   introducing the wellbore isolation device into the wellbore, wherein the isolation device comprises:
   (A) a matrix, wherein the matrix has a phase transition temperature less than or equal to the bottomhole temperature of the wellbore; and
   (B) at least one reinforcement area adjacent to the matrix, wherein the reinforcement area:
      (i) comprises at least a first material, wherein the first material undergoes galvanic corrosion; and
      (ii) has a greater tensile strength and/or shear strength than the matrix; and contacting the first material with an electrolyte, wherein the electrolyte is a wellbore fluid or a reservoir fluid; wherein the concentration of the electrolyte is adjusted to control the rate of galvanic corrosion of the first material.

2. The method according to claim 1, wherein the isolation device is a ball, a plug, a bridge plug, a wiper plug, or a packer.

3. The method according to claim 1, wherein the isolation device restricts or prevents fluid flow between a first zone and a second zone of a subterranean formation, wherein the wellbore penetrates the subterranean formation.

4. The method according to claim 1, wherein the matrix comprises a metal, a metal alloy, a polymer, or combinations thereof.

5. The method according to claim 4, wherein the metal alloy is a fusible metal alloy.

6. The method according to claim 5, wherein the matrix is a eutectic, hypo-eutectic, or hyper-eutectic composition.

7. The method according to claim 4, wherein the polymer is a thermoplastic.

8. The method according to claim 1, wherein the first material is the anode of a galvanic system comprising the first material, a second material, and an electrolyte.

9. The method according to claim 8, wherein the matrix comprises the second material, and wherein the second material is the cathode of the galvanic system.

10. The method according to claim 8, wherein the first material and the second material are metals or metal alloys.

11. The method according to claim 10, wherein the metal or metal of the metal alloy is selected from the group consisting of beryllium, tin, iron, nickel, copper, zinc, magnesium, aluminum, and combinations thereof.

12. The method according to claim 1, wherein the reinforcement area increases the overall strength of the isolation device.

13. The method according to claim 1, wherein the reinforcement area spans the entire perimeter of the isolation device.

14. The method according to claim 1, wherein the reinforcement area is made from pieces of at least the first material bound together.

15. The method according to claim 14, wherein the reinforcement area is cage-like and comprises pores.

16. The method according to claim 14, wherein the pieces of the first material are bound together by the matrix.

17. A method of removing a wellbore isolation device comprising:
introducing the wellbore isolation device into the wellbore, wherein the isolation device comprises:
(A) a matrix, wherein the matrix has a phase transition temperature less than or equal to the bottomhole temperature of the wellbore; and
(B) at least one reinforcement area adjacent to the matrix, wherein the reinforcement area:
(i) comprises at least a first material, wherein the first material undergoes galvanic corrosion; and
(ii) has a greater tensile strength and/or shear strength than the matrix;
causing or allowing at least a portion of the matrix to undergo a phase transition;
contacting the first material with an electrolyte, wherein the electrolyte is a wellbore fluid or a reservoir fluid; wherein the concentration of the electrolyte is adjusted to control the rate of galvanic corrosion of the first material; and
causing or allowing at least a portion of the first material to galvanically corrode.

* * * * *